United States Patent
Cabaj

(10) Patent No.: US 9,744,805 B1
(45) Date of Patent: *Aug. 29, 2017

(54) AXLE ASSEMBLY AND CONTAMINATION SELF-TRAPPING SEAL

(71) Applicant: American Axle & Manufacturing, Inc., Detroit, MI (US)

(72) Inventor: Michael Cabaj, Canton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,289

(22) Filed: Feb. 24, 2017

Related U.S. Application Data

(63) Continuation of application No. 15/297,264, filed on Oct. 19, 2016, now Pat. No. 9,651,153.

(51) Int. Cl.
| | |
|---|---|
| *F16J 15/32* | (2016.01) |
| *B60B 27/00* | (2006.01) |
| *F16J 15/3204* | (2016.01) |
| *F16J 15/3284* | (2016.01) |
| *F16J 15/328* | (2016.01) |

(52) U.S. Cl.
CPC ....... *B60B 27/0073* (2013.01); *F16J 15/3204* (2013.01); *F16J 15/328* (2013.01); *F16J 15/3284* (2013.01); *B60B 2900/211* (2013.01); *B60B 2900/511* (2013.01)

(58) Field of Classification Search
CPC .. F16J 15/3204; F16J 15/3208; F16J 15/3212; F16J 15/3216; F16J 15/3232; F16J 15/3244; F16J 15/3248; F16J 15/3252; F16J 15/3268; F16J 15/328; B60B 2900/211; B60B 2900/511; B60K 17/346
See application file for complete search history.

(56) References Cited

U.S. PATENT DOCUMENTS

| | | |
|---|---|---|
| 4,421,326 A | 12/1983 | Drygalski |
| 4,723,350 A | 2/1988 | Kobayashi et al. |
| 6,315,296 B1 | 11/2001 | Oldenburg |
| 6,953,193 B2 | 10/2005 | Kanzaki |
| 6,979,001 B2 | 12/2005 | Ohtsuki et al. |
| 7,201,380 B2 | 4/2007 | Branchereau |
| 8,800,996 B2 | 8/2014 | Sedlar et al. |
| 8,828,178 B2 | 9/2014 | Yamamoto et al. |
| 8,961,353 B2 | 2/2015 | Valente et al. |
| 2007/0152403 A1 | 7/2007 | Matsui et al. |

(Continued)

*Primary Examiner* — Gilbert Lee
(74) *Attorney, Agent, or Firm* — Harness, Dickey & Pierce, P.L.C.

(57) ABSTRACT

A shaft seal for an axle assembly can include a support body with a circumferentially-extending outer wall member and a radial wall member coupled to the outer wall member and extending radially inwardly therefrom. Sealant disposed on an outside circumferential surface of the outer wall member can form a seal with a surface of a housing bore. A lip can be coupled to the radial wall member and extend radially inward thereof. The lip can form a seal between the radial wall member and an outer surface of a shaft. An annular flange can be coupled to the outer wall member and extend radially outward of an intersection of the outer wall member and the radial wall member, while having a maximum diameter that is smaller than a maximum diameter of the outer wall member. The flange and outer wall member can cooperate to define an annular channel.

22 Claims, 4 Drawing Sheets

(56) References Cited

U.S. PATENT DOCUMENTS

| | | |
|---|---|---|
| 2009/0020960 A1 | 1/2009 | Yamamoto |
| 2010/0320698 A1 | 12/2010 | Shimomura et al. |
| 2012/0099986 A1 | 4/2012 | Hisada et al. |
| 2012/0153573 A1 | 6/2012 | Wade et al. |
| 2016/0010750 A1 | 1/2016 | Colineau et al. |

AXLE ASSEMBLY AND CONTAMINATION SELF-TRAPPING SEAL

CROSS-REFERENCE TO RELATED APPLICATIONS

This application is a continuation of U.S. patent application Ser. No. 15/297,264 filed on Oct. 19, 2016. The entire disclosure of the above application is incorporated herein by reference.

FIELD

The present disclosure relates to an axle assembly and a contamination self-trapping seal.

BACKGROUND

This section provides background information related to the present disclosure which is not necessarily prior art.

Axle assemblies typically include one or more shaft seals, also known as radial lip seals, that can seal between a rotating shaft and a bore of a housing. Radial lip seals typically include a support member formed of a stiff material (e.g., metal) and a sealing lip that can be formed of a resilient material and extends radially inward from the support member to seal with the shaft. In some applications, where the support member contacts the bore of the housing in order to form the seal therewith, a coating on the support member or the bore can be partially scraped off during assembly of the seal in the housing. In some applications, the particles of scraped off coating can contaminate lubricant fluid or other components within the axle assembly.

SUMMARY

This section provides a general summary of the disclosure, and is not a comprehensive disclosure of its full scope or all of its features.

In one form, the present disclosure provides for a shaft seal for an axle assembly can include a support body, a sealant, a seal lip, and an annular flange. The support body can have a circumferentially-extending outer wall member, which extends coaxially with a shaft axis, and a radial wall member that can be fixedly coupled to the outer wall member and extends radially inwardly therefrom. The sealant can be disposed on an outside circumferential surface of at least a portion of the outer wall member. The sealant can be adapted to form a fluid-tight seal between the at least the portion of the outer wall member and a surface of the bore in the housing. The seal lip can extend concentrically about the shaft axis. The seal lip can be coupled to the radial wall member and can extend radially inward of the radial wall member. The seal lip can be adapted to form a fluid-tight seal between the radial wall member and an outer circumferential surface of the shaft. The annular flange can be coupled to the outer wall member and can extend radially outward of a point at which the outer wall member intersects the radial wall member. The annular flange can have a maximum outer diameter that is smaller than a maximum outer diameter of the outer wall member. The annular flange and the outer wall member can cooperate to define an annular channel proximate the radial wall member.

According to a further embodiment of the invention, the seal lip and the annular flange can be unitarily formed.

According to a further embodiment of the invention, the outer wall member can include a first portion, which intersects the radial wall member, and a second portion onto which the sealant is disposed. The maximum outer diameter of the outer wall member can be located on the second portion. An outer diameter of the first portion at a location adjacent to the annular flange can be smaller than the maximum outer diameter of the annular flange.

According to a further embodiment of the invention, the outer wall member can further include a transition portion between the first and second portions. An outer diameter of the transition portion can increase between the first and second portions.

According to a further embodiment of the invention, the outer diameter of the transition portion can increase over at least a portion of a length of the transition portion along the shaft axis in a non-linear manner between the first and second portions.

According to a further embodiment of the invention, the seal lip can be disposed along the shaft axis between the radial wall member and an end of the outer wall member that is opposite the radial wall member.

According to a further embodiment of the invention, the shaft seal can further include a dust lip that can be coupled to the radial wall member and can extend circumferentially about the shaft axis.

According to a further embodiment of the invention, the seal lip and the dust lip can be unitarily and integrally formed.

According to a further embodiment of the invention, the shaft seal can further include a garter spring that can bias the seal lip radially inwardly toward the shaft axis.

According to a further embodiment of the invention, the sealant can include an ultraviolet-cured flow-on gasket.

According to a further embodiment of the invention, the sealant can include latex.

In another form, the present disclosure provides for a power transmitting device including a housing, a shaft, and a seal. The housing can have a bore formed therein. The bore can have an inside circumferential surface. The shaft can be received in the bore for rotation about a shaft axis. The shaft can be rotatable relative to the housing about the shaft axis. The shaft seal can have a support body, a sealant, a seal lip and an annular flange. The support body can have a circumferentially-extending outer wall member, which can extend coaxially with the shaft axis, and a radial wall member that can be fixedly coupled to the outer wall member and can extend radially inwardly therefrom. The sealant can be disposed on an outside circumferential surface of at least a portion of the outer wall member. The sealant can form a fluid-tight seal between the at least the portion of the outer wall member and the inside circumferential surface of the bore in the housing. The seal lip can extend concentrically about the shaft axis. The seal lip can be coupled to the radial wall member and can extend radially inward of the radial wall member. The seal lip can form a fluid-tight seal between the radial wall member and an outer circumferential surface of the shaft. The annular flange can be fixedly coupled to the outer wall member and can extend radially outward of a point at which the outer wall member intersects the radial wall member. The annular flange can have a maximum outer diameter that is smaller than a maximum outer diameter of the outer wall member. The annular flange and the outer wall member can cooperate to define an annular channel proximate the radial wall member.

According to a further embodiment of the invention, the seal lip and the annular flange can be unitarily formed.

According to a further embodiment of the invention, the outer wall member can include a first portion, which intersects the radial wall member, and a second portion onto which the sealant is disposed. The maximum outer diameter of the outer wall member can be located on the second portion. An outer diameter of the first portion at a location adjacent to the annular flange can be smaller than the maximum outer diameter of the annular flange.

According to a further embodiment of the invention, the outer wall member can further include a transition portion between the first and second portions. An outer diameter of the transition portion can increase between the first and second portions.

According to a further embodiment of the invention, the outer diameter of the transition portion can increase over at least a portion of a length of the transition portion along the shaft axis in a non-linear manner between the first and second portions.

According to a further embodiment of the invention, the seal lip can be disposed along the shaft axis between the radial wall member and an end of the outer wall member that is opposite the radial wall member.

According to a further embodiment of the invention, the seal can further include a dust lip that can be coupled to the radial wall member and extend circumferentially about the shaft axis.

According to a further embodiment of the invention, the seal lip and the dust lip can be unitarily and integrally formed.

According to a further embodiment of the invention, the seal can further include a garter spring that can bias the seal lip radially inwardly toward the shaft axis.

According to a further embodiment of the invention, the sealant can include an ultraviolet-cured flow-on gasket.

According to a further embodiment of the invention, the sealant can include latex.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
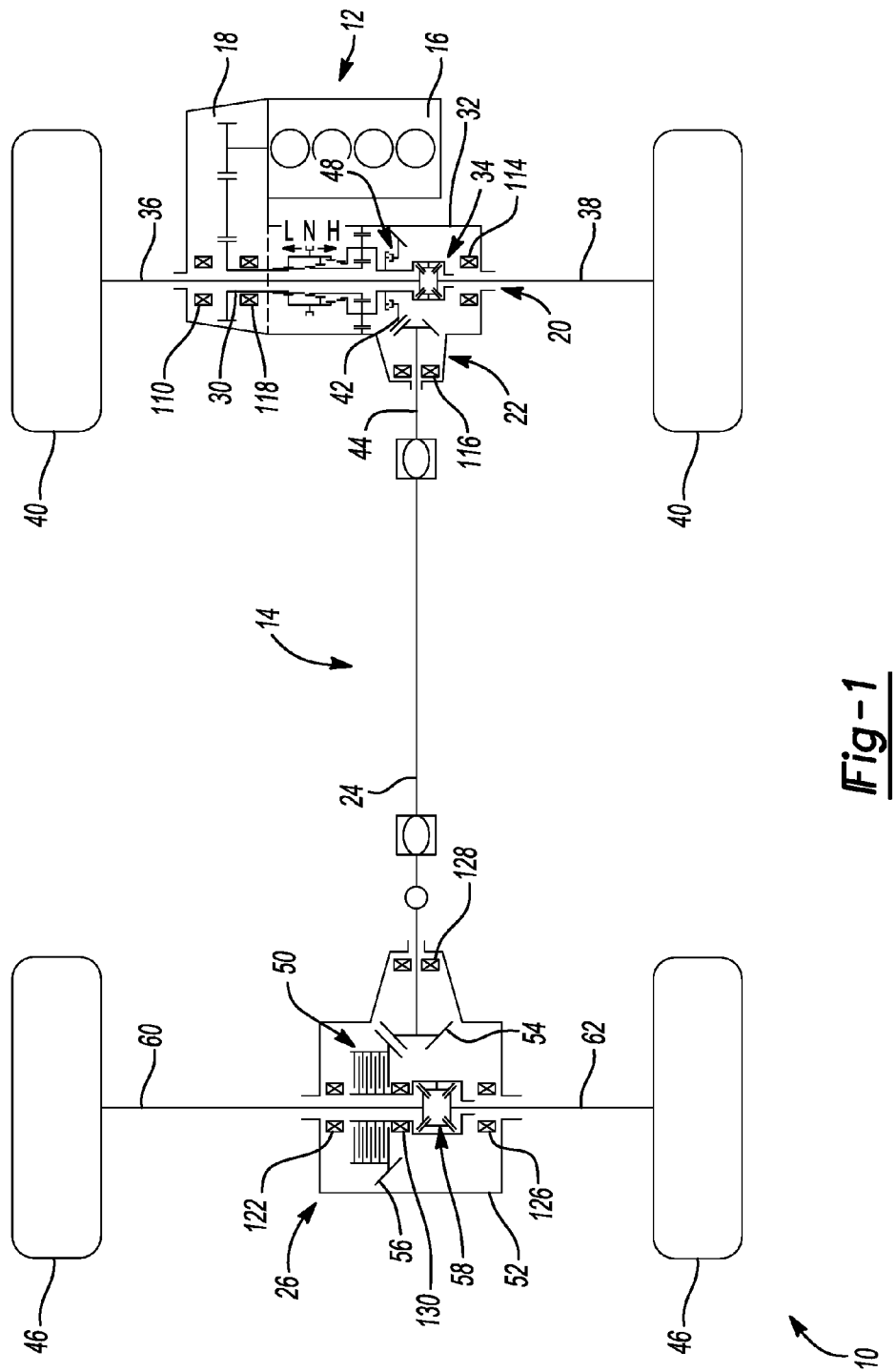
FIG. 1 is a schematic illustration of an example of a vehicle having an axle assembly constructed in accordance with the teachings of the present disclosure.

With reference to FIG. 1 of the drawings, an example of a vehicle having an axle assembly that includes a seal constructed in accordance with the teachings of the present disclosure is generally indicated by reference numeral 10. The vehicle 10 can have a powertrain 12 and a driveline 14. The powertrain 12 can be conventionally constructed and can comprise a power source 16 and a transmission 18. The power source 16 can be configured to provide propulsive power and can comprise an internal combustion engine and/or an electric motor, for example.

The transmission 18 can receive propulsive power from the power source 16 and can output rotary power to the driveline 14. The transmission 18 can have a plurality of automatically or manually-selected gear ratios. The driveline 14 in the particular example provided is of an all-wheel drive configuration, but those of skill in the art will appreciate that the teachings of the present disclosure are applicable to other driveline configurations, including four-wheel drive configurations, rear-wheel drive configurations, and front-wheel drive configurations for example.

The driveline 14 can include a front axle assembly 20, a power take-off unit (PTU) 22, a prop shaft 24 and a rear axle assembly 26. An output of the transmission 18 can be coupled to an input of the front axle assembly 20 to drive an input member 30 of the front axle assembly 20. The front axle assembly 20 can have a housing 32, a first differential 34, and a plurality of seals. The first differential 34 can be disposed within the housing 32 and drivingly coupled to the input member 30 to receive input torque therefrom. The first differential 34 can be any suitable torque differentiating means configured to output differential torque to a pair of outputs 36, 38. In the example provided, the first differential 34 is an open differential, though other configurations can be used. Each of the outputs 36, 38 can be drivingly coupled to a corresponding one of a pair of first drive wheels 40 (e.g., front drive wheels).

The seals can be disposed within the housing 32 and configured to seal between the housing 32 and a rotating member to inhibit fluid (e.g., lubricating and/or cooling fluid) from passing between the rotating member and the housing 32 at the location of the seal. For example, seal 110 can form a seal between the output 36 and the housing 32 to prevent lubricant fluid from exiting the housing 32 and prevent debris, or external fluid from entering the housing 32. Similarly, seal 114 can form a seal between the output 38 and the housing 32 to prevent lubricant fluid from exiting the housing 32 and prevent debris, or external fluid from entering the housing 32. Similarly, seal 116 can form a seal between the PTU output member 44 and the housing 32 to prevent lubricant fluid from exiting the housing 32 and prevent debris, or external fluid from entering the housing 32.

Other seals can form a seal within the housing 32 to prevent movement of fluid and/or particulates between different compartments within the housing 32. For example, seal 118 can form a seal between the input member 30 and the housing 32 to prevent lubricant fluid and/or particulates from traveling between the front axle assembly 20 and the transmission 18. While only seals 110, 114, and 118 are illustrated, the front axle assembly 20 can include additional seals similar to seals 110, 114, or 118, configured to seal between the housing 32 and various rotating shafts within the front axle assembly 20. The seals (e.g., seals 110, 114, 118) are described in greater detail below.

The PTU 22 can have a PTU input member 42, which can receive rotary power from the input member 30 of the front axle assembly 20, and a PTU output member 44 that can transmit rotary power to the prop shaft 24.

The prop shaft 24 can couple the PTU output member 44 to the rear axle assembly 26 such that rotary power output by the PTU 22 is received by the rear axle assembly 26. The front axle assembly 20 and the rear axle assembly 26 could be driven on a full-time basis to drive the front drive wheels 40 along with second drive wheels 46 (e.g., rear drive wheels), respectively. It will be appreciated, however, that the driveline 14 could include one or more clutches to interrupt the transmission of rotary power through a part of the driveline 14. In the particular example provided, the driveline 14 includes a first clutch 48, which can be configured to interrupt the transmission of rotary power into or through the PTU 22, and a second clutch 50, which can be configured to interrupt the transmission of rotary power into or through components within the rear axle assembly 26.

A more detailed discussion of the front axle assembly 20, the PTU 22 and the first clutch 48 is not pertinent to the axle assembly and seals of the present disclosure and as such, need not be described in extensive detail herein as these components can be constructed as described in detail in U.S. Pat. No. 8,961,353, the disclosure of which is incorporated by reference as if fully set forth in detail herein.

The rear axle assembly 26 can include a housing 52, an input pinion 54, a ring gear 56, a second differential assembly 58, a pair of second shafts or output members 60, 62, the second (axle disconnect) clutch 50, and a plurality of seals. The input pinion 54, ring gear 56, second differential assembly 58, and axle disconnect clutch 50 can be disposed within the housing 52 of the rear axle assembly 26. The input pinion 54 can be coupled to an end of the prop shaft 24 for rotation therewith. The ring gear 56 can be meshed with the input pinion 54 and can be a bevel ring gear. The second differential assembly 58 can be configured to receive rotary power transmitted through the ring gear 56 and can output differential torque to the output members 60, 62. The second differential assembly 58 can be any suitable means for permitting speed differentiation between the output members 60, 62. In the example provided, the second differential assembly 58 can be an open differential, though other configurations can be used. Each of the output members 60, 62 can be drivingly coupled to a corresponding one of the rear wheels 46.

The axle disconnect clutch 50 is a torque transfer device that can selectively interrupt power transmission through the second differential assembly 58. The axle disconnect clutch 50 can be any type of clutch and can be mounted coaxially with the second differential assembly 58. In the particular example provided, the axle disconnect clutch 50 is a friction clutch, though other configurations can be used. In the example provided, the axle disconnect clutch 50 can interrupt torque transfer between the ring gear 56 and the second differential assembly 58. In this way, operation of the vehicle 10 in a front-wheel drive mode will not permit the rear wheels 46 to "back drive" the ring gear 56. In an alternative construction, not specifically shown, the disconnect clutch 50 can interrupt torque transfer between the second differential assembly 58 and one or both of the outputs 60, 62.

The seals can be disposed within the housing 52 and configured to seal between the housing 52 and a rotating member to inhibit fluid (e.g., lubricating and/or cooling fluid) from passing between the rotating member and the housing 52 at the location of the seal. For example, seal 122 can form a seal between the output 60 and the housing 52 to prevent lubricant fluid from exiting the housing 52 and prevent debris, or external fluid from entering the housing 52. Similarly, seal 126 can form a seal between the output 62 and the housing 52 to prevent lubricant fluid from exiting the housing 52 and prevent debris, or external fluid from entering the housing 52. Similarly, seal 128 can form a seal between the input pinion 54 and the housing 52 to prevent lubricant fluid from exiting the housing 52 and prevent debris, or external fluid from entering the housing Other seals can form a seal within the housing 52 to prevent movement of fluid and/or particulates between different compartments within the housing 52. For example, seal 130 can form a seal between a rotating member of the second clutch 50 and the housing 52 to prevent lubricant fluid and/or particulates from traveling between compartments within the rear axle assembly 26 that separate the second clutch 50 from the second differential assembly 58. While only seals 122, 126, and 130 are illustrated, the rear axle assembly 26 can include additional seals similar to seals 122, 126, or 130, configured to seal between the housing 52 and various rotating shafts within the rear axle assembly 26. The seals (e.g., seals 122, 126, 130) are described in greater detail below.

Figure 3:
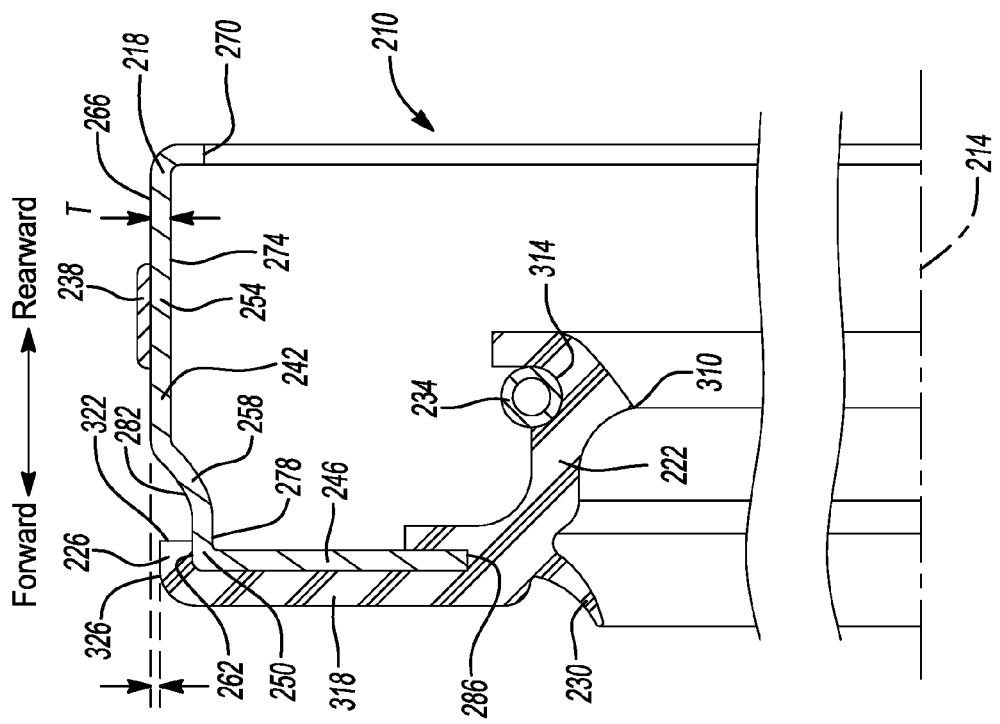
FIG. 3 is a sectional view of the seal of FIG. 2.
Figure 2:
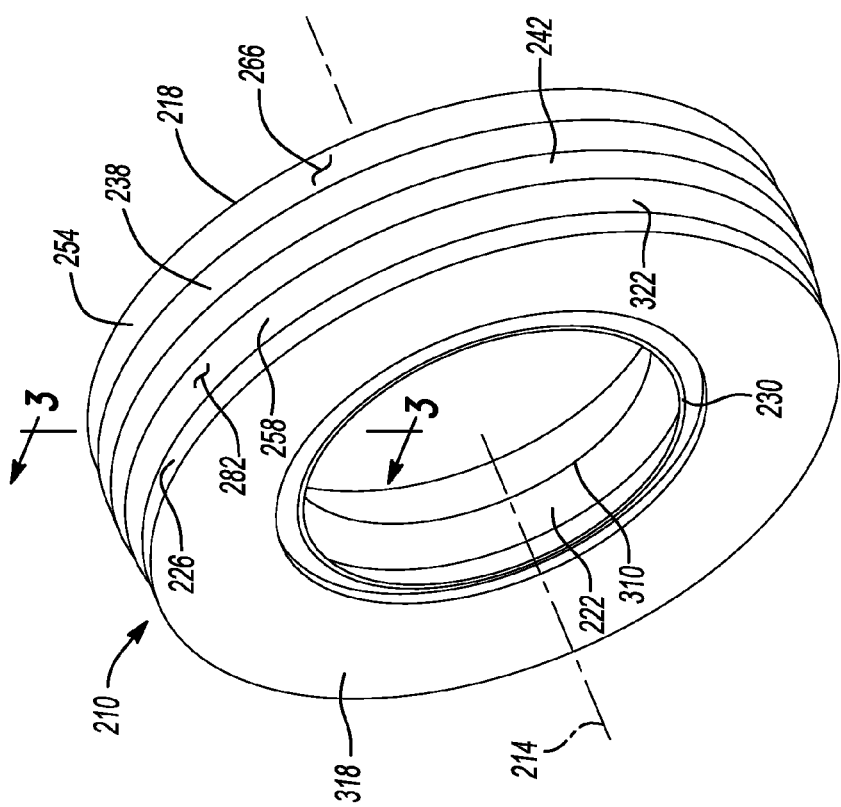
FIG. 2 is a perspective view of a seal of the axle assembly of FIG. 1.

With additional reference to FIGS. 2 and 3, a seal, of the type commonly known as a shaft seal or a lip seal for sealing between a rotating shaft and a non-rotating housing, is generally indicated by reference numeral 210. The shaft seal 210 can be used in the front or rear axle assemblies 20, or 26, such as for the seals 110, 114, 116, 118, 122, 126, 128, 130, for example, or can be used in other similar axle assemblies (not specifically shown). The shaft seal 210 has a generally annular shape disposed about a central axis 214. The shaft seal 210 can include an annular support casing or body 218, an annular sealing lip 222, and an annular flange 226. In the example provided, the shaft seal 210 can also include an annular dust lip 230, an annular garter spring 234, and a sealant layer 238.

The support body 218 can include an outer member 242 and a wall member 246 that can generally form an "L" shaped cross-section. In the example provided, the support body 218 can have a thickness T, that can be approximately uniform across the outer member 242 and the wall member 246, though other configurations can be used. In the example provided, the support body 218 is formed by stamping a single, annular piece of metal into a shape that includes the outer member 242 and the wall member 246, though other materials or processes can be used.

The outer member 242 can be disposed about the axis 214. The outer member 242 can have a first portion 250, a second portion 254, and a transition portion 258. The first portion 250 can have a radially outermost first surface 262 that can have a first diameter. The outermost first surface 262 can be generally parallel to the axis 214 and extend circumferentially about the axis 214.

The second portion 254 can have a radially outermost second surface 266 that can have a second diameter that can be greater than the first diameter. The outermost second surface 266 can be generally parallel to the axis 214 and extend circumferentially about the axis 214. A rearward axial end of the second portion 254 can include an annular shoulder 270 that can extend radially inward of the rest of the second portion 254. The shoulder 270 can extend radially inward of an inner surface 274 of the second portion 254, while being radially outward of an inner surface 278 of the first portion 250.

The transition portion 258 can fixedly connect the first and second portions 250, 254 such that the transition portion 258 can have a diameter that increases from the first diameter to the second diameter. In other words, a forward axial end of the transition portion 258 can be fixedly coupled to the first portion, a rearward axial end of the transition portion 258 can be fixedly coupled to the second portion 254, and the diameter of the transition portion 258 can increase with increased distance from the first portion 250. The transition portion 258 can join the second portion 254 at a forward axial end of the second portion 254. In the example provided, the transition portion 258 is curved to be concave, open away from the axis 214. In other words, the transition portion 258 can have a concave outer surface 282 that faces radially outward from the axis 214.

The wall member 246 can have a radially outer section that is fixedly coupled to the forward axial end of the first portion 250. The wall member 246 can extend radially inward from the first portion 250 toward the axis 214 to define a radially inner bore 286. In this way, the wall member 246 can form an annular disc shaped wall that is transverse to the axis 214. In the example provided, the wall member 246 is perpendicular to the axis 214, though other configurations could be used.

The sealing lip 222 can be formed of a resilient material (e.g., rubber or elastomeric polymer) that can be overmolded onto the wall member 246. The sealing lip 222 can extend radially inward from the bore 286 of the wall member 246 and axially from the wall member 246 in the rearward axial direction. The sealing lip 222 can extend axially rearward of the transition portion 258, while terminating axially forward of the shoulder 270 of the second portion 254. A radially inner side of the sealing lip 222 can have a sealing edge 310 that forms the radially innermost part of the sealing lip 222. The sealing edge 310 can also form the radially innermost part of the entire shaft seal 210. A radially outer side of the sealing lip 222 can include a spring groove 314. The spring groove 314 can be radially outward of the sealing edge 310 and can be axially aligned generally with the sealing edge 310. The spring groove 314 can extend circumferentially about the axis 214.

The garter spring 234 can be disposed in the spring groove 314 of the sealing lip 222 and can extend about the axis 214. The garter spring 234 can be any suitable garter spring configured to exert inward radial forces to bias the sealing edge 310 radially inward. In the example provided, the garter spring 234 is an extension-coil type garter spring, though other configurations can be used.

The dust lip 230 can be formed of a resilient material (e.g., rubber or elastomeric polymer) that can be unitarily formed with the sealing lip 222. The dust lip 230 can be the same material as the sealing lip 222 and can be formed in a single overmolding process. The dust lip 230 can extend axially forward and radially inward from the radially inward side of the sealing lip 222, on a forward axial end of the sealing lip 222, i.e., proximate to the wall member 246 and distal to the sealing edge 310. In the example provided, the dust lip 230 extends axially forward of the wall member 246.

The flange 226 can be formed of a resilient material (e.g., rubber or elastomeric polymer). In the example provided, the flange 226 can be unitarily formed with the sealing lip 222 and the dust lip 230, such that a connecting portion 318 of the total overmolded material can cover the forward side of the wall member 246 to connect the flange 226 with the sealing lip 222 and dust lip 230. The flange 226 can be disposed axially proximate to the forward axial end of the first portion 250 and can extend radially outward therefrom, such that the flange 226, the rearward end of the first portion 250, the transition portion 258, and the forward end of the second portion 254 can define a recess or channel 322 that extends circumferentially about the axis 214. In the example provided, the flange 226 can extend axially in the rearward direction to overlap a portion of the outermost first surface 262. In the example provided, the flange 226 does not extend axially over the entire first portion 250, though other configurations can be used.

In an alternative construction, not specifically shown, the flange 226 can extend axially over the entire first portion 250 and terminate axially at the transition portion 258, without extending axially over the transition portion 258, such that the flange 226, the transition portion 258, and the forward end of the second portion 254 can define the channel 322. In yet another alternative construction, not specifically shown, the flange 226 can extend axially rearward to cover a minor portion of the transition portion 258, without covering the entire transition portion 258, such that the flange 226, the uncovered transition portion 258, and the forward end of the second portion 254 can define the channel 322.

Returning to the example provided, the flange 226 can extend radially outward to an outer flange surface 326 that can have a third diameter that is less than the second diameter and greater than the first diameter. In other words, the outer flange surface 326 can be radially outward of the outermost first surface 262 and radially inward of the outermost second surface 266 when the shaft seal 210 is in its natural state (e.g., absent external forces acting on the shaft seal 210). In the example provided, the outer flange surface 326 can be disposed radially between the outermost second surface 266 and radially outward of the inner surface 274 of the second portion 254. In an alternative construction, not specifically shown, the outer flange surface 326 can be disposed radially between the outermost first surface 262 and the inner surface 274 of the second portion 254 when the shaft seal 210 is in its natural state.

The sealant layer 238 can be any suitable type of outer diameter sealant applied to the outermost second surface 266. For example, the sealant layer 238 can be a flow-on-gasket (e.g., an ultra-violet cured flow-on-gasket), or a coating of paint (e.g., latex bore coat). The sealant layer 238 can be disposed along a discrete axial location along the outermost second surface 266, or can be disposed along the entire outermost second surface 266, such that the sealant layer 238 can be axially rearward of the channel 322. In the example provided, the sealant layer 238 is disposed at approximately the axial center of the outermost second surface 266, though other configurations can be used.

With additional reference to FIGS. 4-7, the shaft seal 210 is illustrated in different stages of assembly into an axle assembly 410. The axle assembly 410 can be any suitable axle assembly and can be similar to the front axle assembly 20 (FIG. 1) or the rear axle assembly 26 (FIG. 1). The axle assembly 410 can include a housing 414 and a shaft 418 that is rotatable relative to the housing 414. The housing 414 and shaft 418 can be similar to one of the housings 32, 52 and a corresponding one of the inputs, outputs, shafts, or other rotating members 30, 36, 38, 44, 54, 58, 60, 62.

The shaft 418 can have an outer surface 422 that has a diameter that is greater than an innermost diameter of the sealing edge 310 when the shaft seal 210 is in its natural state. Thus, the garter spring 234 can bias the sealing edge 310 into sealing contact with the outer surface 422 of the shaft 418. In the example provided, the sealing edge 310 is compressed against the shaft 418 to form a seal therewith that can inhibit fluid 426 (e.g., lubricant and/or cooling oil)

from passing between the shaft 418 and the sealing lip 222. The diameter of the outer surface 422 of the shaft 418 can also be greater than an innermost diameter of the dust lip 230 when the shaft seal 210 is in its natural state. Thus, the resilient nature of the dust lip 230 can bias the dust lip 230 into contact with the outer surface 422 of the shaft 418. The dust lip 230 can be in sealing contact with the outer surface 422 to inhibit dust or particulates from passing between the shaft 418 and the dust lip 230. Thus, the dust lip 230 can prevent contamination of the fluid 426 and components of the axle assembly 410 by dust or particulates.

The housing 414 can define a housing bore 430 that can have a fourth diameter. The shaft 418 can extend coaxially within the housing bore 430 and the shaft seal 210 can be coaxially between the shaft 418 and the housing bore 430. The fourth diameter (i.e., the diameter of the housing bore 430) can be less than the second diameter (i.e., the diameter of the outermost second surface 266), such that the outermost second surface 266 can be inserted into the housing bore 430 by an interference fit. Alternatively, the fourth diameter can be equal to the second diameter, such that the outermost second surface 266 can be inserted into the housing bore 430 by a press fit. The sealant layer 238 can form a seal between the outermost second surface 266 and the housing bore 430 when the shaft seal 210 is disposed within the housing bore 430, as described in greater detail below.

The fourth diameter can be slightly greater than the third diameter (i.e., the outer diameter of the flange 226), such that a small gap 434 (best shown in FIG. 7) can exist between the flange 226 and the housing bore 430 when the shaft seal 210 is fully installed in the axle assembly 410. In an alternative construction, not specifically shown, the fourth diameter can be equal to the third diameter, such that the flange 226 contacts the housing bore 430 without forming a air-tight or a fluid-tight seal therewith, but while still preventing particulates from moving between the flange 226 and housing bore 430, as described in more detail below.

Figure 4:
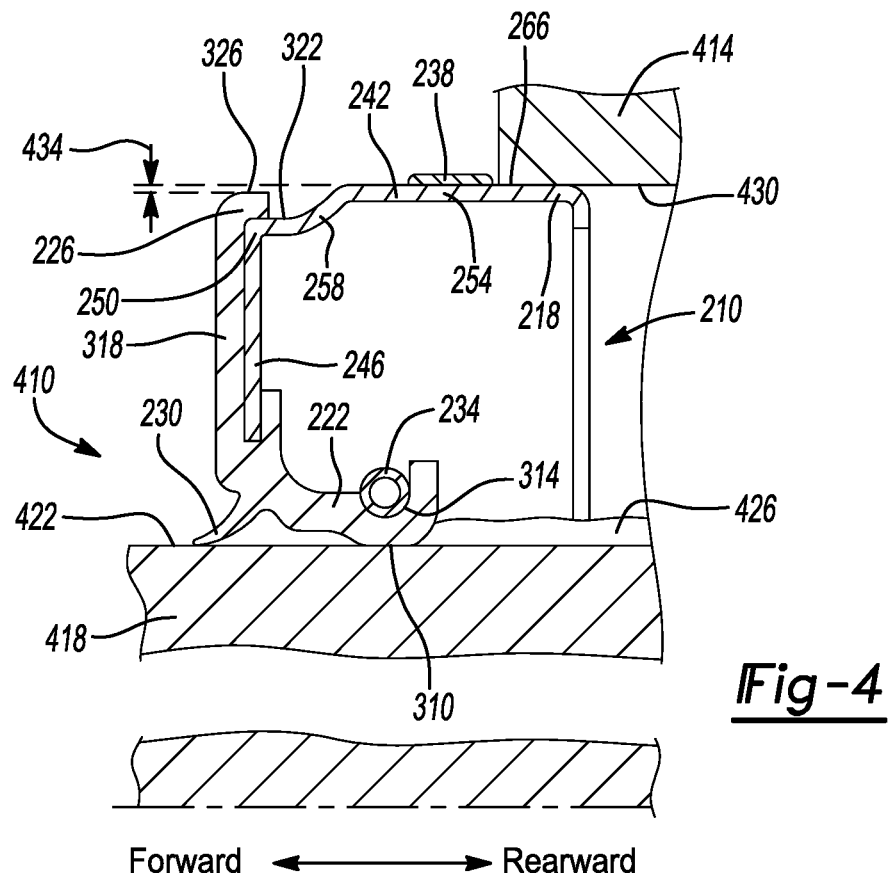
FIG. 4 is a sectional view similar to FIG. 3, illustrating the seal in a first position, relative to a housing and a shaft of the axle assembly of FIG. 1, during assembly of the seal in the axle assembly.

With specific reference to FIG. 4, the shaft seal 210 is illustrated in a first position relative to the housing 414. In the first position, the rearward axial end of the second portion 254 has been pressed into the housing bore 430 such that the outermost second surface 266 opposes and is in contact with the housing bore 430. From the first position, the shaft seal 210 can be moved axially rearward relative to the housing 414, until the shaft seal 210 is in a second position (shown in FIG. 5).

Figure 5:
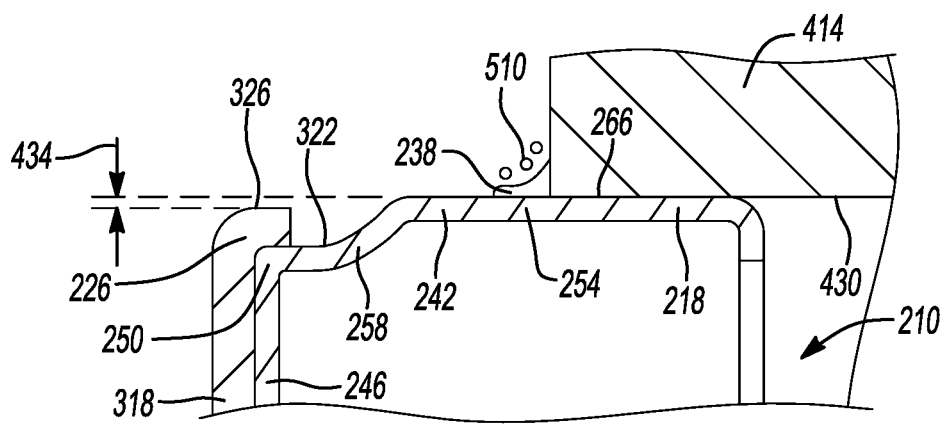
FIG. 5 is a sectional view of a portion of the seal of FIG. 4, illustrating the seal in a second position, relative to a housing, during assembly of the seal in the axle assembly.

With specific reference to FIG. 5, as the seal is moved from the first position (FIG. 4) to the second position (FIG. 5), the housing bore 430 can scrape or peel off some of the sealant layer 238. The scraped off parts of the sealant layer 238 are illustrated by particles 510. While not specifically illustrated, a thin layer of the sealant layer 238 can remain between the outermost second surface 266 and the housing bore 430 to form a fluid-tight seal therebetween. From the second position, the shaft seal 210 can be moved axially rearward relative to the housing 414, until the shaft seal 210 is in a third position (shown in FIG. 6).

Figure 6:
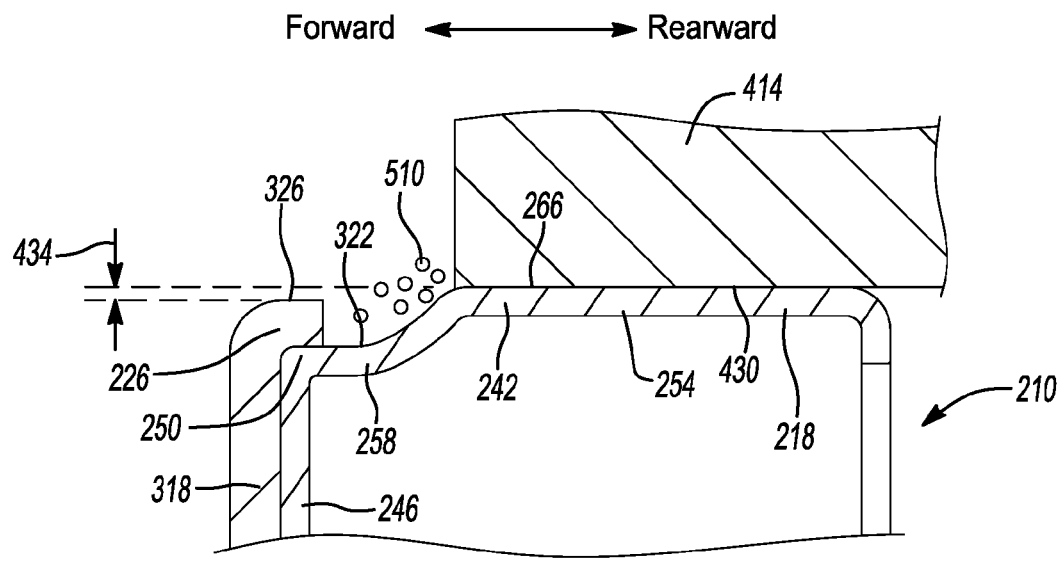
FIG. 6 is a sectional view similar to FIG. 5, illustrating the seal in a third position, relative to a housing, during assembly of the seal in the axle assembly.

With specific reference to FIG. 6, as the shaft seal 210 is moved from the second position (FIG. 5) to the third position (FIG. 6), the housing bore 430 can continue to scrape or peel off some of the sealant layer 238 (FIGS. 3-5). The particles 510 can be pushed by the housing 414 into the channel 322 of the shaft seal 210. From the third position, the shaft seal 210 can be moved axially rearward relative to the housing 414, until the shaft seal is in a fourth position (shown in FIG. 7).

Figure 7:
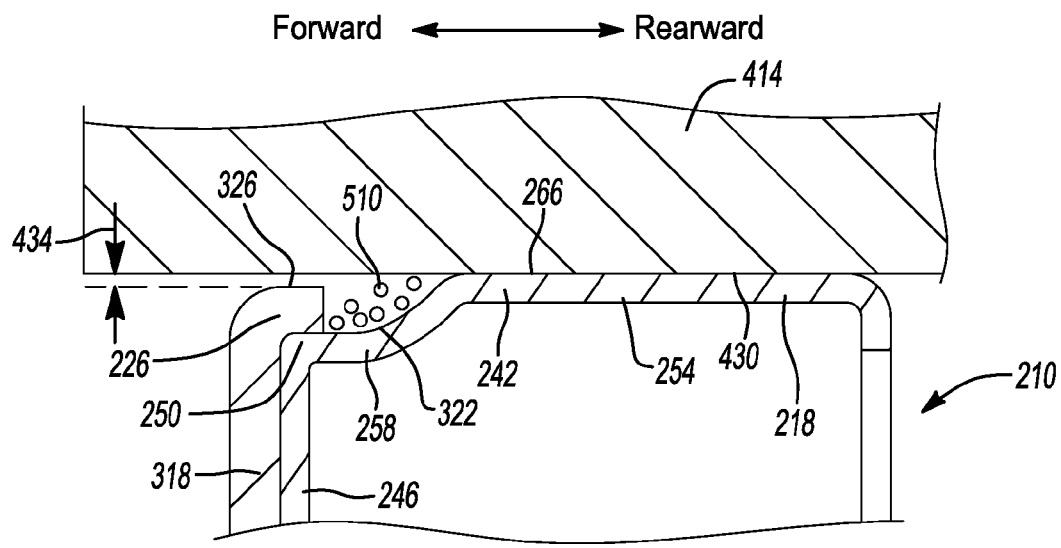
FIG. 7 is a sectional view similar to FIG. 5, illustrating the seal in a fourth position, relative to a housing, during assembly of the seal in the axle assembly.

With specific reference to FIG. 7, as the shaft seal 210 is moved from the third position (FIG. 6) to the fourth position (FIG. 7), the flange 226 can be received in the housing bore 430. The particles 510 can become trapped in the channel 322, such that the flange prevents the particles 510 from moving between the flange 226 and the housing bore 430. While the shaft seal 210 is moved from the third position (FIG. 6) to the fourth position (FIG. 7), the relative diameters of the flange 226 and the housing bore 430 (i.e., third and fourth diameters) is such that air is permitted to pass between the flange 226 and the housing bore 430. As a result, air is not trapped in the channel 322 and air pressure does not build up within the channel during assembly. Such a pressure build up could exert axial pressure to inhibit insertion of the shaft seal 210 into the housing bore 430, or act to move the shaft seal axially away from its fully assembled position. Thus, a non-hermetic seal feature of the flange relative to the housing bore 430 has the added benefit of improved assembly of the axle assembly 410.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A shaft seal for sealing between a bore in a housing and a shaft that is received in the bore and is rotatable about an axis relative to the housing, the shaft seal comprising:
    a support body having a circumferentially-extending outer wall member, which extends coaxially with a shaft axis, and a radial wall member that is fixedly coupled to the outer wall member and extends radially inwardly therefrom;
    a sealant disposed on an outside circumferential surface of at least a portion of the outer wall member, the sealant being adapted to form a fluid-tight seal between the at least the portion of the outer wall member and a surface of the bore in the housing;
    a seal lip extending concentrically about the shaft axis, the seal lip being coupled to the radial wall member and extending radially inward of the radial wall member, the seal lip being adapted to form a fluid-tight seal between the radial wall member and an outer circumferential surface of the shaft; and
    an annular flange coupled to the outer wall member and extending radially outward of a point at which the outer wall member intersects the radial wall member, the annular flange having a maximum outer diameter that is smaller than a maximum outer diameter of the outer wall member, the annular flange and the outer wall member cooperating to define an annular channel proximate the radial wall member.

2. The shaft seal of claim 1, wherein the seal lip and the annular flange are unitarily formed.

3. The shaft seal of claim 1, wherein the outer wall member includes a first portion, which intersects the radial wall member, and a second portion onto which the sealant is disposed, wherein the maximum outer diameter of the outer wall member is located on the second portion, and wherein an outer diameter of the first portion at a location adjacent to the annular flange is smaller than the maximum outer diameter of the annular flange.

4. The shaft seal of claim 3, wherein the outer wall member further includes a transition portion between the first and second portions, and wherein an outer diameter of the transition portion increases between the first and second portions.

5. The shaft seal of claim 4, wherein the outer diameter of the transition portion increases over at least a portion of a length of the transition portion along the shaft axis in a non-linear manner between the first and second portions.

6. The shaft seal of claim 1, wherein the seal lip is disposed along the shaft axis between the radial wall member and an end of the outer wall member that is opposite the radial wall member.

7. The shaft seal of claim 1, further comprising a dust lip that is coupled to the radial wall member and extends circumferentially about the shaft axis.

8. The shaft seal of claim 7, wherein the seal lip and the dust lip are unitarily and integrally formed.

9. The shaft seal of claim 1, further comprising a garter spring that biases the seal lip radially inwardly toward the shaft axis.

10. The shaft seal of claim 1, wherein the sealant comprises an ultraviolet-cured flow-on gasket.

11. The shaft seal of claim 1, wherein the sealant comprises latex.

12. A power transmitting device comprising:
    a housing having a bore formed therein, the bore having an inside circumferential surface;
    a shaft received in the bore for rotation about a shaft axis, the shaft being rotatable relative to the housing about the shaft axis; and
    a shaft seal having a support body, a sealant, a seal lip and an annular flange, the support body having a circumferentially-extending outer wall member, which extends coaxially with the shaft axis, and a radial wall member that is fixedly coupled to the outer wall member and extends radially inwardly therefrom, the sealant being disposed on an outside circumferential surface of at least a portion of the outer wall member, the sealant forming a fluid-tight seal between the at least portion of the outer wall member and the inside circumferential surface of the bore in the housing, the seal lip extending concentrically about the shaft axis, the seal lip being coupled to the radial wall member and extending radially inward of the radial wall member, the seal lip forming a fluid-tight seal between the radial wall member and an outer circumferential surface of the shaft, the annular flange being fixedly coupled to the outer wall member and extending radially outward of a point at which the outer wall member intersects the radial wall member, the annular flange having a maximum outer diameter that is smaller than a maximum outer diameter of the outer wall member, the annular flange and the outer wall member cooperating to define an annular channel proximate the radial wall member.

13. The power transmitting device of claim 12, wherein the seal lip and the annular flange are unitarily formed.

14. The power transmitting device of claim 12, wherein the outer wall member includes a first portion, which intersects the radial wall member, and a second portion onto which the sealant is disposed, wherein the maximum outer diameter of the outer wall member is located on the second portion, and wherein an outer diameter of the first portion at a location adjacent to the annular flange is smaller than the maximum outer diameter of the annular flange.

15. The power transmitting device of claim 14, wherein the outer wall member further includes a transition portion between the first and second portions, and wherein an outer diameter of the transition portion increases between the first and second portions.

16. The power transmitting device of claim 15, wherein the outer diameter of the transition portion increases over at least a portion of a length of the transition portion along the shaft axis in a non-linear manner between the first and second portions.

17. The power transmitting device of claim 12, wherein the seal lip is disposed along the shaft axis between the radial wall member and an end of the outer wall member that is opposite the radial wall member.

18. The power transmitting device of claim 12, further comprising a dust lip that is coupled to the radial wall member and extends circumferentially about the shaft axis.

19. The power transmitting device of claim 18, wherein the seal lip and the dust lip are unitarily and integrally formed.

20. The power transmitting device of claim 12, further comprising a garter spring that biases the seal lip radially inwardly toward the shaft axis.

21. The power transmitting device of claim 12, wherein the sealant comprises an ultraviolet-cured flow-on gasket.

22. The power transmitting device of claim 12, wherein the sealant comprises latex.

* * * * *